J. F. Schuffenecker,
Brick Machine.
N° 46,273. Patented Feb. 7, 1865.
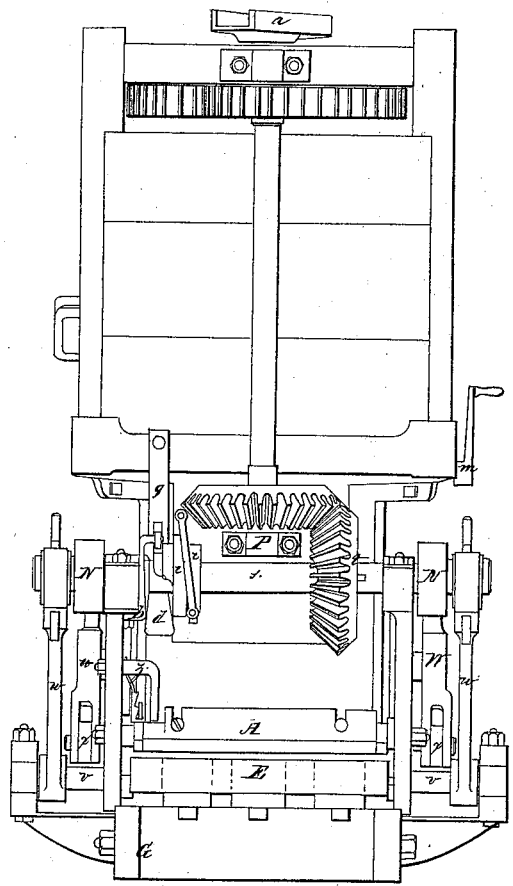
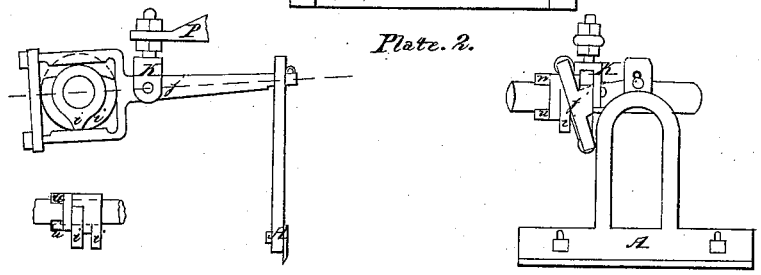
Witnesses:

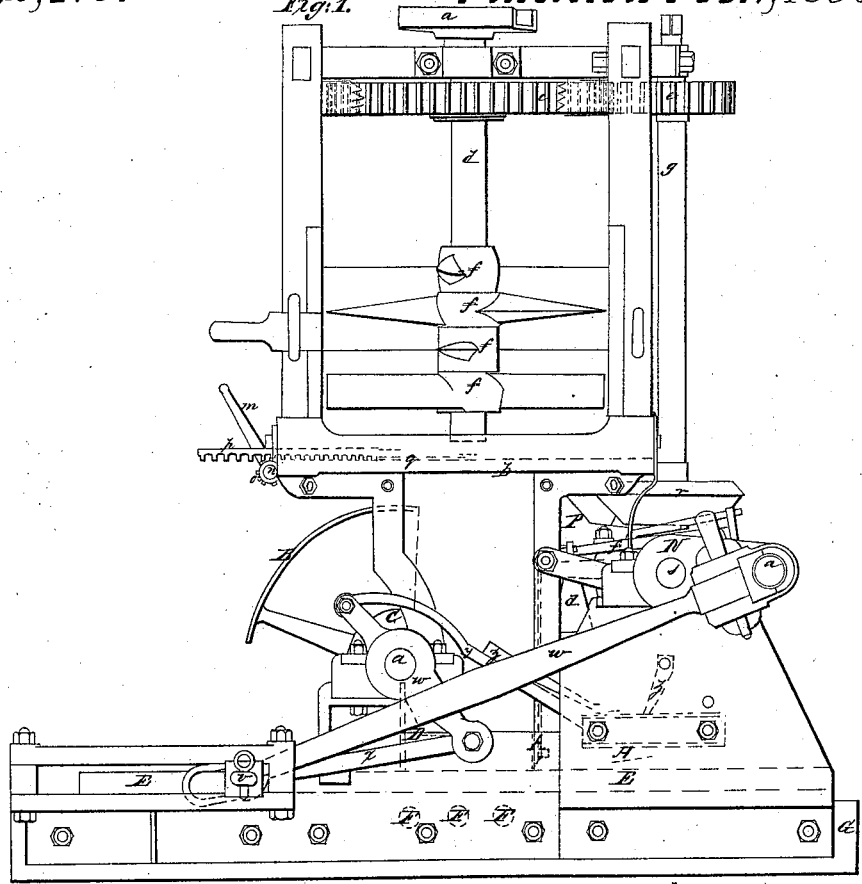
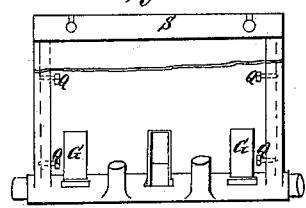
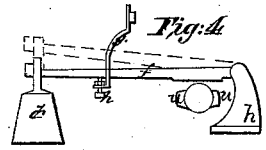
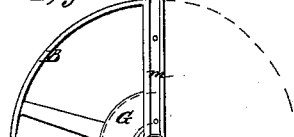
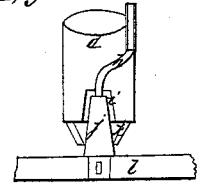

UNITED STATES PATENT OFFICE.

JOHN F. SCHUFFENECKER, OF ST. LOUIS, MISSOURI.

MACHINE FOR MAKING BRICKS.

Specification forming part of Letters Patent No. 46,273, dated February 7, 1865; antedated February 3, 1865.

*To all whom it may concern:*

Be it known that I, JOHN F. SCHUFFE-NECKER, of St. Louis, in the county of St. Louis and State of Missouri, have invented an improved and useful machine for making bricks of tempered clay; and I do hereby declare that the following is a full and exact description thereof, reference being had to the accompanying drawings and the letters of reference marked thereon, in which—

Figure 1 is a side view of the machine. Fig. 2 is a front end view.

In Fig. 1, $a$ is a cross-head, to which a lever is secured to operate the machine. $d$ is a vertical shaft. $e$ and $c$ are spur wheels. $ffff$ are knives by which the clay is tempered. $g$ is a vertical shaft. To prevent the clay from settling into the pan I use the following mode, hollow shafts or solid. $h$ is a tube. $i$ is a steel pan. $j$ is a toe, adjusted into the cross-bar $l$. $k$ is a cup, adjusted to the toe, and strikes against the lower end of the vertical shaft. The oil is introduced to the pan by the tube $h$. (See Plate 1, Fig. 3.) $n$ is a shaft which extends partially at the rear end of the machine. $m$ is a crank. $o$ is a pinion. Both are secured to the said shaft. $p$ is a rack. $q$ are the shutters, which are secured to the said rack by screws. $b$ is the lower part of the hopper. P is a support secured to the front end of the machine. $r$ is a wheel fastened to the vertical shaft $g$. $s$ is a horizontal shaft, which extends across the front end of the machine. $u$ is a wrist fitted into the crank N. $v$ is a driving-bar, which extends across the rear end of the machine. $w$ is a rod which connects the driving-bar to the crank. $w$ is a double crank. The upper part of it has a slot. $x$ is a rod which has a slot at the left end, and is attached to the driving-bar. The other end is connected to the lower part of the double crank by a pin. $y$ is a rod attached to the upper part of the double crank. The other end is connected to the scraper A. $z$ is a spring secured to the said rod. A is a scraper (in the inside of the machine.) $a$ is the axle of the quadrant B. $c$ are safety openings. D is a grate. E are the molds. F are rollers upon which the molds are moved. G is the frame of the machine. $z$ is a stud. $d$ is a weight attached to the lever $f$. The other end of it is linked to the stand $h$. $g$ is a guide. The upper part of it is secured to the hopper. At the lower end of it is a set-screw, $h$, with a nut and a slot, through which the lever $f$ passes.

In Fig. 2, $a$ is a cross-head. $m$ is a crank. $g$ is a guide. $h$ is a stand. $j$ is a part of the fork-lever. P is a support. $i$ is a cam-yoke. $t$ is a wheel fastened to the horizontal shaft $s$. $z$ is a stud; A, a scraper; E, molds; G, the frame of the machine. N are cranks; $w$, double cranks. $w$ are rods; $v$, parts of the driving-bar.

The following description will show how the machine is operated: I place the clay into the hopper, and when perfectly mixed I open the shutters by the crank $m$ at the left side of the machine sufficiently to pass the clay. $v$ is a driving-bar, and to which a reciprocating motion is communicated by the rod $w$. A corresponding rod on the opposite side of the machine, a set of molds, being placed on the apron in front of the driving-bar, is by a revolution of the horizontal shaft $s$ driven forward sufficiently to permit another set of molds to be introduced into the space as the driving-bar again retreats. The rod $x$, attached at one end of the driving-bar, at the other end to the lower end of the double crank by a wrist or pin, moves the quadrant B. The quadrant is moving on its axle $a$, rises at the proper time to allow the clay to pass to the grate. When it moves from left to right it presses the clay through the grate into the molds. The apertures $c$ allow the superfluous clay to pass out and to be deposited in the empty molds in rear of those which are thus filled. The molds are moved forward previous of the rising of the quadrant.

Descriptions and operations of Plate 2, Figs. 1 and 2: To prevent the clay from being drawn away in front of the brick, I use a scraper, A, which is raised above the surface of the mold as much as necessary, and is brought down as soon as the mold has passed the scraper about three-eighths of an inch. These two motions are caused by the connections of the cams $i\ i$, fork-lever $j$, scraper A, and joint K. This joint has a screw on the upper part with two nuts, which are for the purpose of regulating the level of the fork-lever as necessary. This said joint is fastened to the support P. (See Fig. 1.) After this another scraper, A, moving from left to right, levels down the portion which has escaped the action of the scraper A. This scraper when it moves to the right is turned in such a position as to rise above the mold, and is held in the same by a spring, $z$, as soon as the arm I has dropped into the groove of the spring. The changes of positions are caused by studs, or as the spring strikes against the machine.

Descriptions and operations of Plate 1, Figs. 1, 2, 4: To equalize the friction of the machine I use the following mode: The cam $u$ will raise the lever as the driving-bar is to move from left to right. The said lever will rest upon the set-screw as soon as the driving-bar is to strike against the right end of the slot of the rod $x$. (See Fig. 4.) These frictions are caused as the crank N is to pass its centers. To prevent the clay from settling between the quadrant and the hopper, I fit a set of steel bars into the grooves of the quadrant. These bars are managed by set-screws or by springs. To prevent the clay from settling between the upper part of the quadrant and the hopper I use a plate, S, which is held to the hopper by screws loose enough, so it will move by its own weight or its equivalent. These apertures are for the purpose of taking off the loose motions of the quadrant.

What I claim as new improvements, and desire to secure by Letters Patent, are the following points:

1. The manner adopted by using the toe $j$, pan $i$, cup $k$, and tube $h$, in combination for the purpose herein described.

2. The scraper A, operated by the cams $i\ i$, fork-lever $j$, and joint K, as for the purpose above described.

3. The manner to secure the position of the scraper A by means of the spring $z$ and arm I, as shown in the specifications.

4. The manner adopted to regulate the friction of the machine by the cams $u\ u$, lever $f$, guide $g$, set-screw $h$, in combination of the slot of the rod $x$, as shown and described in the foregoing specification.

5. The mode adapted to prevent the clay from settling between hopper and the quadrant by means of the plate S, grooves R, steel bar $m$, and set-screws Q Q Q Q, or their equivalent, for the purpose set forth.

JOHN F. SCHUFFENECKER.

Witnesses:
  H. MORYER,
  WM. MILLER.